(12) United States Patent
Hsu

(10) Patent No.: US 7,388,621 B2
(45) Date of Patent: Jun. 17, 2008

(54) SYSTEMS AND METHODS FOR IMAGE PROCESSING PROVIDING NOISE REDUCTION AND EDGE ENHANCEMENT

(75) Inventor: Chuan-Chang Hsu, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 534 days.

(21) Appl. No.: 11/000,671

(22) Filed: Nov. 30, 2004

(65) Prior Publication Data

US 2006/0114357 A1 Jun. 1, 2006

(51) Int. Cl.
*H04N 5/21* (2006.01)
*G06K 9/48* (2006.01)

(52) U.S. Cl. ............................. 348/606; 382/266

(58) Field of Classification Search ............ 348/606, 348/607, 625, 701; 382/260, 266, 275; 358/3.27, 358/3.26; 345/611
See application file for complete search history.

(56) References Cited

U.S. PATENT DOCUMENTS

| | | | |
|---|---|---|---|
| 5,561,724 A | 10/1996 | Kido et al. | |
| 5,757,977 A | 5/1998 | Mancuso et al. | 382/260 |
| 5,852,475 A * | 12/1998 | Gupta et al. | 348/606 |
| 5,926,577 A | 7/1999 | Kasahara et al. | 382/266 |
| 5,959,693 A | 9/1999 | Wu et al. | |
| 6,721,016 B1 * | 4/2004 | Hamajima | 348/497 |
| 6,771,320 B2 * | 8/2004 | Choi | 348/625 |
| 7,167,594 B2 | 1/2007 | Ruol et al. | |
| 2003/0156222 A1 * | 8/2003 | Weston et al. | 348/606 |
| 2004/0085458 A1 * | 5/2004 | Yanof et al. | 348/223.1 |
| 2004/0190787 A1 | 9/2004 | Nakami | |
| 2005/0008251 A1 * | 1/2005 | Chiang | 382/266 |
| 2006/0020203 A1 * | 1/2006 | Tamura | 600/437 |

OTHER PUBLICATIONS

CN Office Action mailed Mar. 30, 2007.

* cited by examiner

*Primary Examiner*—Victor R. Kostak
(74) *Attorney, Agent, or Firm*—Thomas, Kayden, Horstemeyer & Risley (57) ABSTRACT

Image processing methods and systems for noise reduction and edge enhancement. A variation detector is provided to evaluate measures of edge existence in a plurality of predetermined directions within pixels of a video signal, and determine a control signal according to a level of variation on the measures of edge existence. A noise reduction circuit and edge enhancement circuit filter and edge enhance the video signal, respectively, according to the control signal.

21 Claims, 7 Drawing Sheets

SYSTEMS AND METHODS FOR IMAGE PROCESSING PROVIDING NOISE REDUCTION AND EDGE ENHANCEMENT

BACKGROUND

The invention relates to image processing methods and systems for video signals, and more specifically, to image processing methods and systems providing video noise reduction and edge enhancement.

In image signal processing, reduction of noise and edge enhancement are two important processes. Video signal bandwidth is typically limited as the video signals are compressed by JPEG or MPEG for transmission. Compressed video signals can lose image edges or so called details of image as high frequency components of the signals are attenuated. Noise reduction usually involves averaging, suppression, or blurring, and edge enhancement usually involves an unsharp masking or Laplacian filter (or a high pass filter). Image processing methods for noise reduction usually entail smearing of details, whereas methods for edge enhancement usually enhance unwanted noise and edges simultaneously. The two processes are difficult to reconcile as the noise reduction process requires a further reduction of the video signal band and removal of high frequency components while the edge enhancement process requires increased high frequency components of the signals. A preferred solution is to discriminate noises from edges in image processing such that details can be preserved after noise reduction and only edges are enhanced in edge enhancement.

A video signal processing circuit disclosed in U.S. Pat. No. 5,926,577 performs noise reduction and edge enhancement without considering edge information in the noise reduction process, to reference to prevent details from smearing. Furthermore, noisy signals are provided to the input of the horizontal and vertical edge enhancement signal generation circuits, causing both noise and edge to be enhanced. In U.S. Pat. No. 5,757,977, a fuzzy logic filter detects edge directions and noise level, and selects a most probable edge direction for edge enhancement without discrimination between smooth areas and areas with edge. The strategy of choosing the most probable edge direction for edge enhancement may not be appropriate for each image area, since, for example, edge enhancement may readily enhance noise in image areas belong to smooth area.

SUMMARY

Image processing methods and systems, and player devices for a video signal are provided. Embodiments of an image processing method for noise reduction and edge enhancement comprise extracting a plurality of pixels from a video signal, evaluating measures of edge existence in a plurality of predetermined directions within the extracted pixels, and determining a control signal according to a level of variation on the measures of edge existence. In some embodiments, the measures of edge existence are represented by probabilities. The control signal is then provided for noise reduction and edge enhancement on the extracted pixels.

Embodiments of an image processing system comprise a variation detector, a noise reduction circuit, and an edge enhancement circuit. The variation detector evaluates measures of edge existence in a plurality of predetermined directions within pixels extracted from a video signal, and determines a control signal according to a level of variation on the measures of edge existence. The noise reduction circuit performs noise reduction on the pixels of the video signal according to the control signal, and the edge enhancement circuit receives the output of the noise reduction circuit and performs edge enhancement on the pixels of the video signal according to the control signal.

Also provided is an image processing system implemented in a video player device, executing noise reduction and edge enhancement according to a level of variation on the measures of edge existence evaluated in predetermined directions.

DESCRIPTION OF THE DRAWINGS

The invention can be more fully understood by reading the subsequent detailed description in conjunction with the examples and references made to the accompanying drawings, wherein.

DETAILED DESCRIPTION

Figure 1:
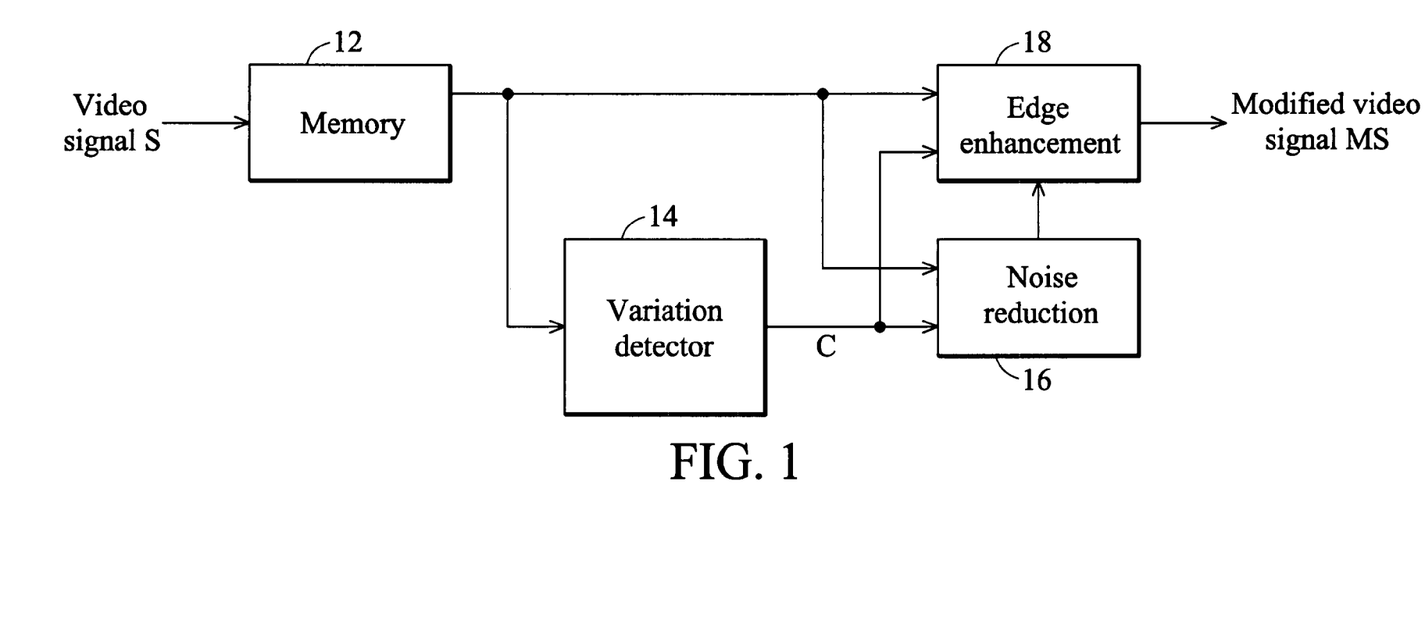
FIG. 1 is a schematic diagram illustrating an embodiment of an image processing system for noise reduction and edge enhancement.

Image processing methods, systems, and video player devices providing noise reduction and edge enhancement are provided. FIG. 1 is a block diagram illustrating an embodiment of an image processing system. The image processing system comprises a memory 12, a variation detector 14, a noise reduction circuit 16, and an edge enhancement circuit 18. The memory 12 buffers and delays a video signal S for one or more line periods. The variation detector 14 measures probabilities or likelihood of edge existence in predetermined directions, and generates a control signal C indicating a level of variations on the set of probabilities. Low variation indicates little edge tendency and the high frequency components are expected noises. High variation indicates a strong edge tendency. The control signal C is provided to the noise reduction and edge enhancement circuits 16 and 18 to control filtering and edge enhancement. The noise reduction circuit 16 filters the video signal output from the memory 12 according to the control signal, generating a noise reduced video signal to the edge enhancement circuit 18 to produce a modified video signal MS.

Figure 2:
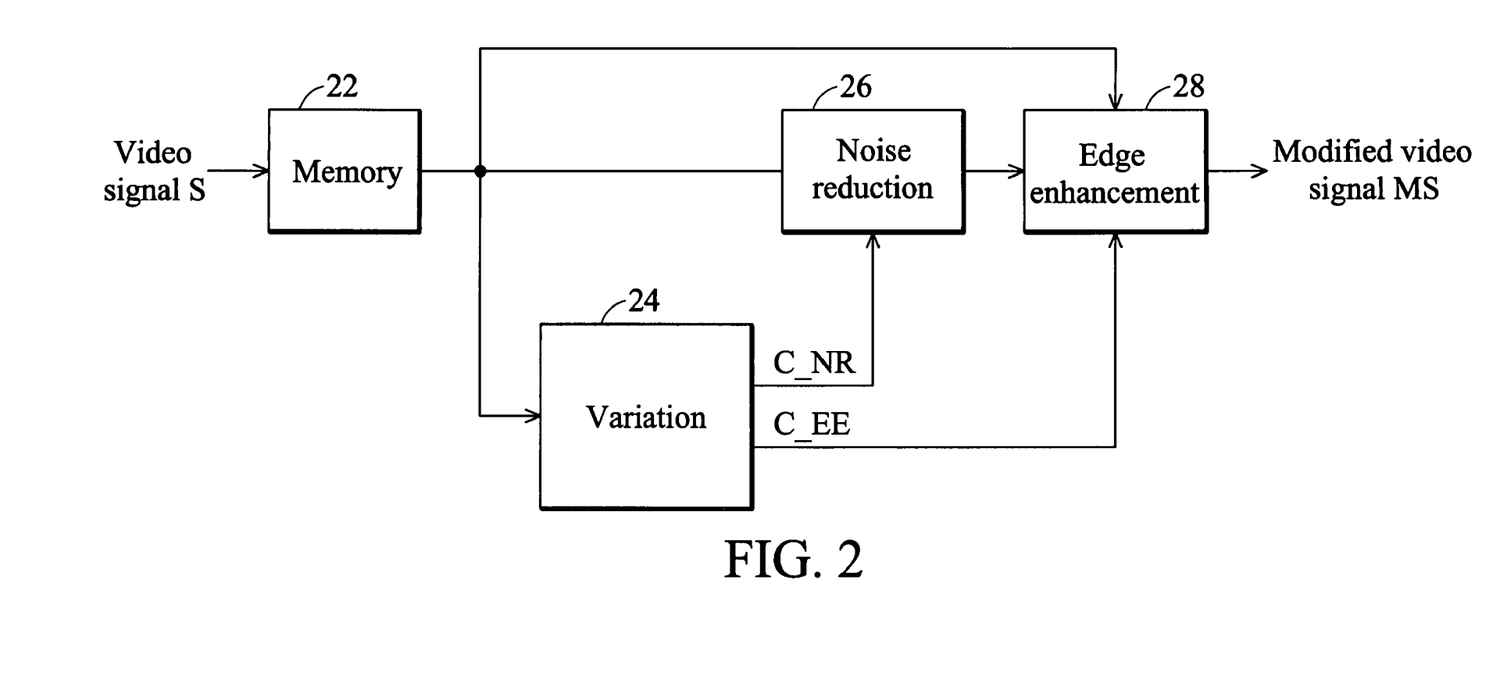
FIG. 2 shows another image processing system for noise reduction and edge enhancement.

FIG. 2 shows another image processing system for executing noise reduction and edge enhancement for a video signal. The image processing system comprises a memory device 22, a variation detector 24, a noise reduction circuit 26, and an edge enhancement circuit 28. The memory buffers a target pixel and reference pixels in the video signal. The variation detector 24 determines a control signal C_NR for noise reduction and a control signal C_EE for edge enhancement, provided to the noise reduction circuit 26 and edge enhancement circuit 28 respectively.

Figure 3A:
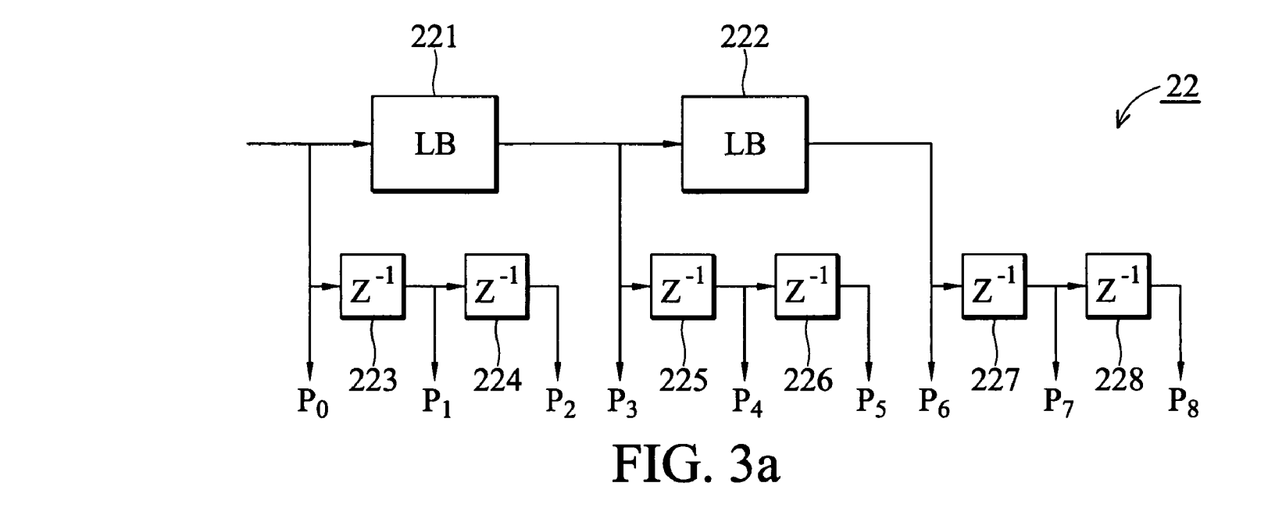
FIG. 3a shows an embodiment of a memory device buffering and delaying 9 pixels in a video signal, performing noise reduction and edge enhancement on a target pixel.
Figure 3B:
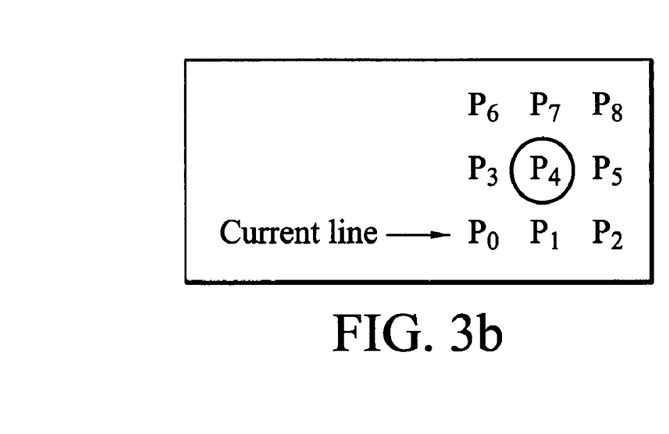
FIG. 3b shows the relationship between a target pixel and the eight neighbor pixels in the video signal.

FIG. 3a shows an embodiment of a memory device 22 buffering and delaying 9 pixels in a video signal S performing noise reduction and edge enhancement on a target pixel P4. FIG. 3b shows the relationship between the target pixel $P_4$ and eight neighbor pixels $P_0$~$P_3$, $P_5$~$P_8$ in the video signal S. The neighbor pixels are also referred to as reference pixels of the target pixel. The memory device 22 comprises two line buffers (LB) 221 and 222, and six pixel buffers 223~228 for buffering pixels $P_0$~$P_8$. The buffered pixels are provided to the variation detector, noise reduction circuit, and edge enhancement circuit.

Figure 4:
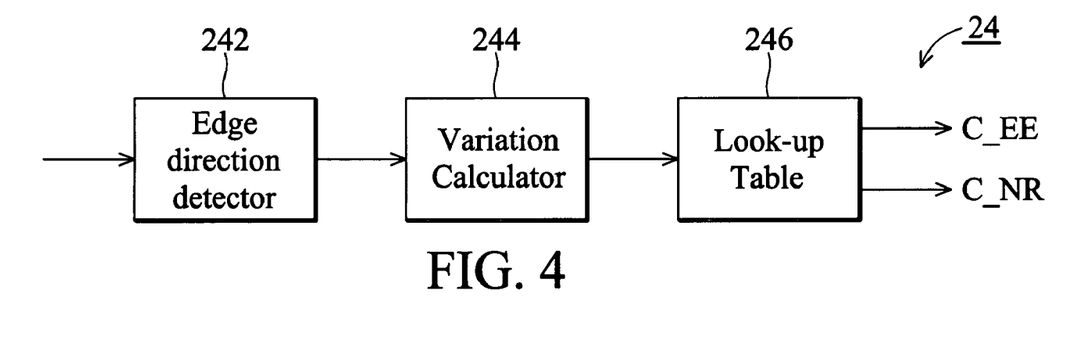
FIG. 4 is a schematic diagram illustrating an embodiment of a variation detector.

Variation detector 24 may comprise an edge direction detector 242, a variation calculator 244, and a look-up table 246 as shown in FIG. 4. The edge direction detector 242 measures probabilities of edge existence in predetermined directions, and the variation calculator 244 calculates a level of variation v. The look-up table 246 maps the level of variation v output from the variation calculator 244 to locate control signals C_EE and C_NR according to a non-decreasing function and a non-increasing function respectively. Equation (1) is an example of the non-decreasing mapping function, and equation (2) is an example of the non-increasing mapping function, wherein C is a constant.

$$1 - \frac{1}{\sqrt{1 + c \times v^2}} \quad \text{Equation (1)}$$

$$\frac{1}{\sqrt{1 + c \times v^2}} \quad \text{Equation (2)}$$

Figure 5:
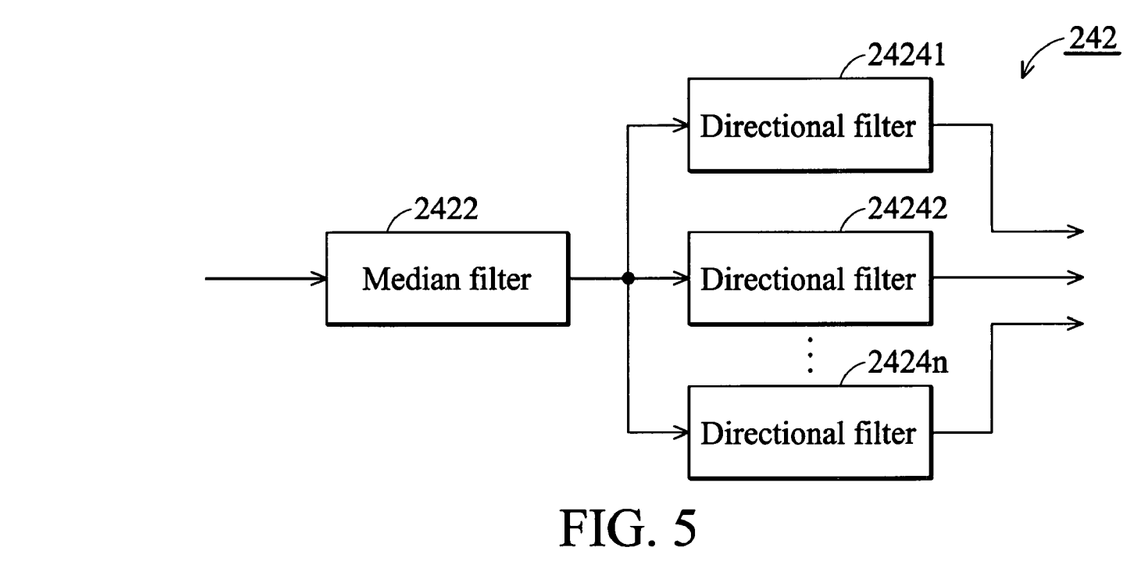
FIG. 5 is a schematic diagram illustrating an embodiment of an edge direction detector.
Figure 6:
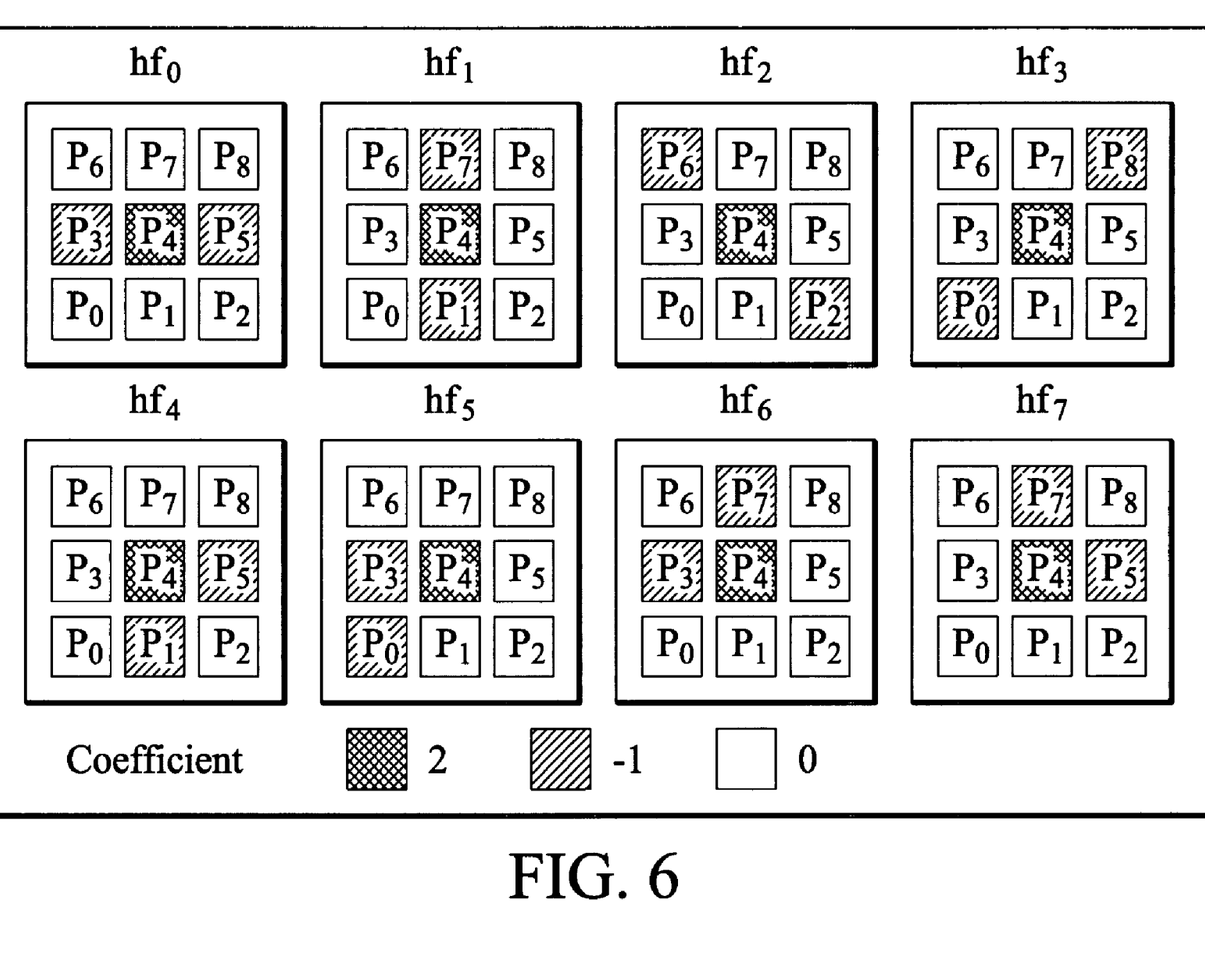
FIG. 6 illustrates an example of a set of eight directional filters when the memory provides a target pixel $P_4$ and eight neighbor pixels $P_0$~$P_3$, $P_5$~$P_8$ to the directional filters as shown in FIG. 3b.
Figure 7:
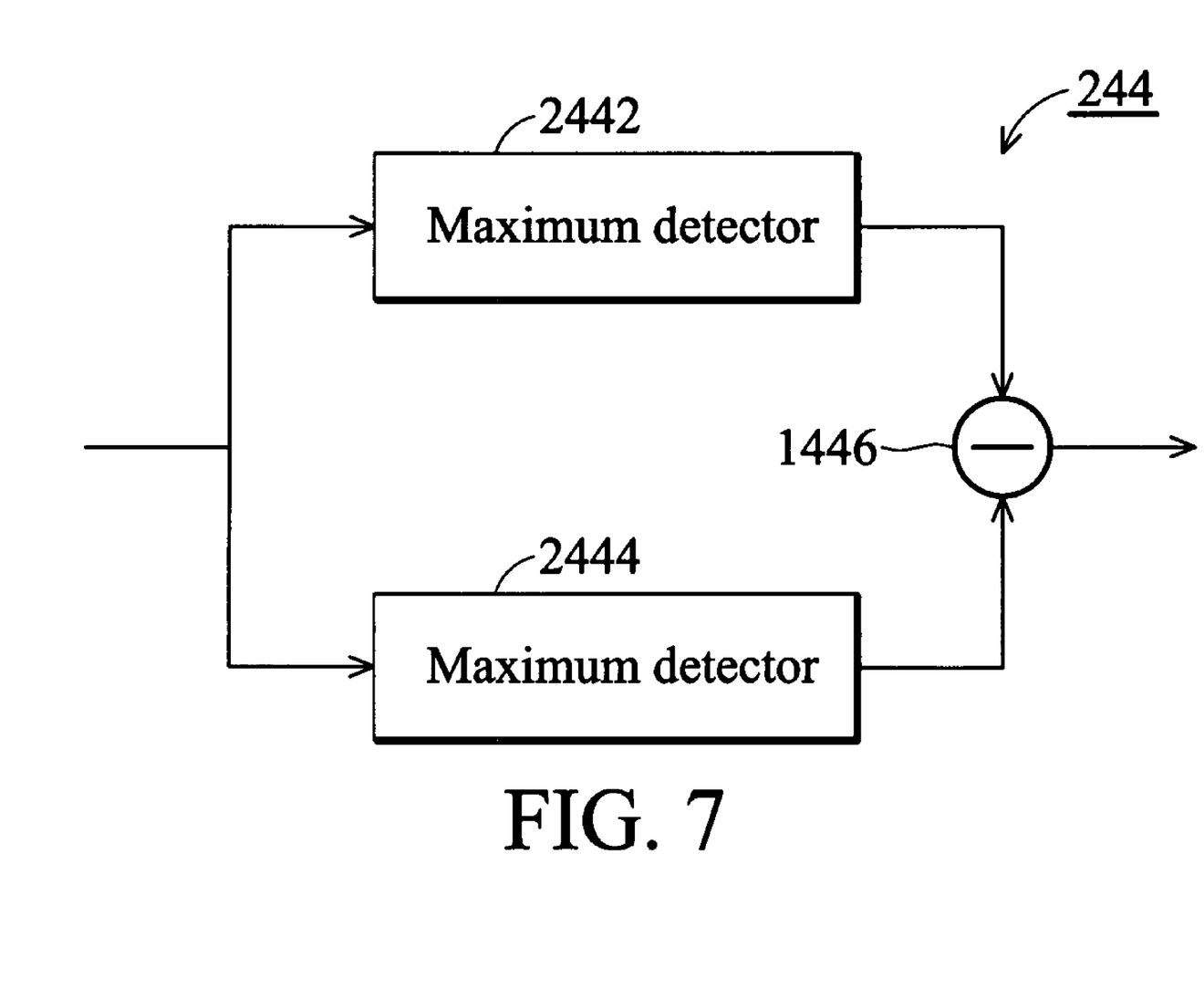
FIG. 7 is a schematic diagram illustrating an embodiment of a variation calculator.

The edge direction detector 242 may be implemented by a median filter 2422 and n directional filters 24241~2424n as shown in FIG. 5. The median filter 2422 reduces the influence of noises on detection of edge existence by replacing the original value of a target pixel with a median of the target pixel and predetermined neighbor pixels of the target pixel. The predetermined neighbor pixels here are the eight nearest pixels to the target pixel. The median filter 2422 then outputs the median to the n directional filters 24241~2424n, and each directional filter measures the likelihood of edge existence in a predetermined direction. FIG. 6 illustrates an example of a set of eight directional filters when the memory provides a target pixel $P_4$ and eight neighbor pixels $P_0$~$P_3$, $P_5$~$P_8$ to the directional filters as shown in FIG. 3b. Each directional filter $hf_0$~$hf_7$ detects a correlation between three pixels forming an edge pattern. The correlation is calculated by multiplying a set of coefficients, for example, {−1, 2, −1}, to the three pixels. The output of the directional filter $hf_0$ equals the absolute value of −1×p3+2×p4−1×p5, which indicates the correlation of the target pixel p4 with respect to the horizontal direction. Similarly, the output of the directional filter $hf_1$ equals the absolute value of −1×p7+2×p4−1×p1, which indicates the correlation of the target pixel p4 with respect to the vertical direction.

Figure 8:
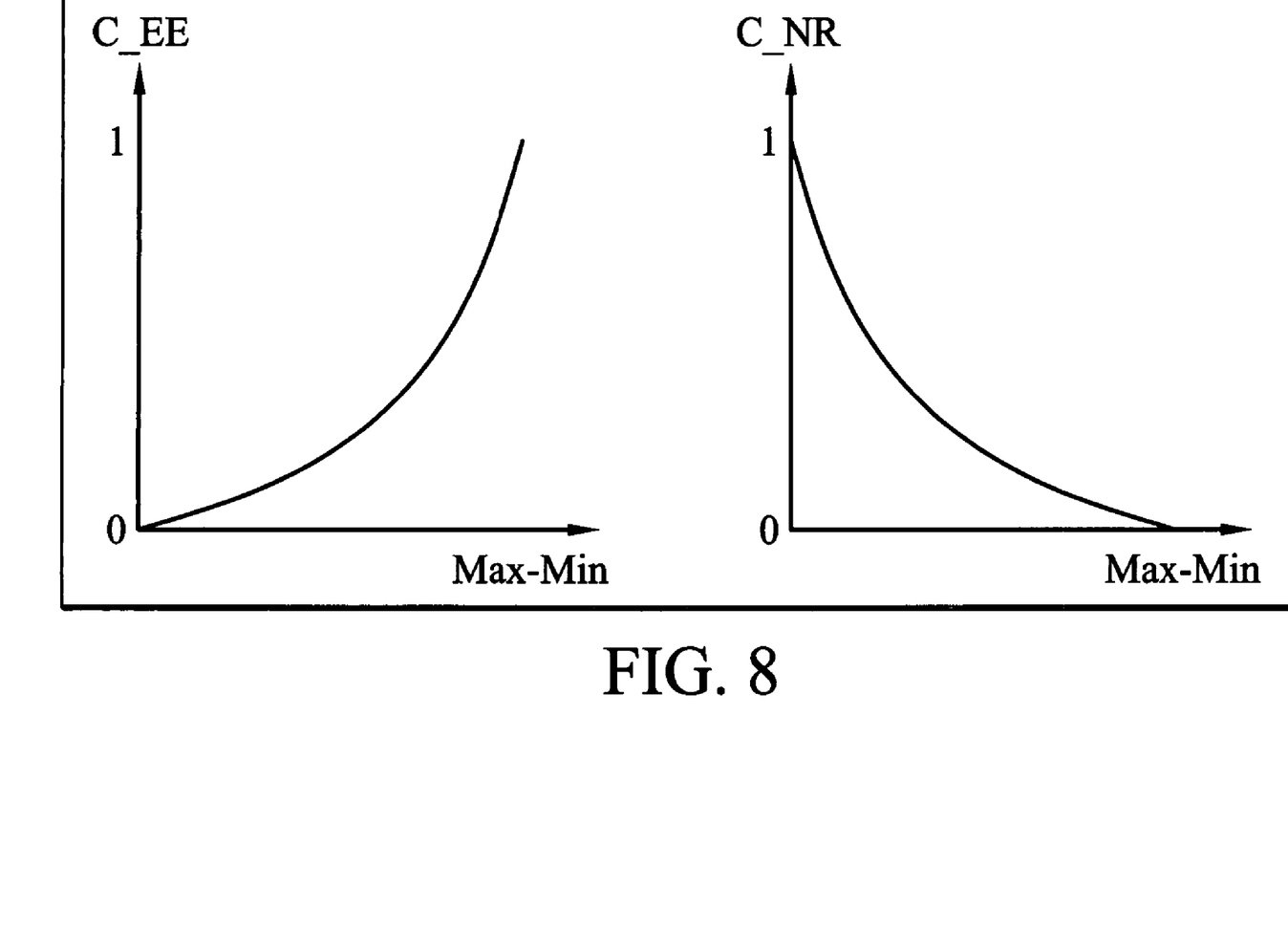
FIG. 8 shows the relationships between the difference (Max−Min) and the two control signals C_EE and C_NR.

The variation calculator 244 of FIG. 4 comprises a maximum detector 2442 and a minimum detector 2444, which detect the maximum and minimum value of a set of correlations provided by the edge direction detector 242. The subtractor 1446 calculates and outputs a difference between the maximum and minimum values detected by the maximum 2442 and minimum 2444 detectors respectively. The difference is the level of variation, an indication of the likelihood of edge existence. A large difference indicates that the set of correlations contains a significant amount of edge orientation information, and a small difference indicates that the set of correlations contains an insignificant amount of edge orientation information. The difference (Max−Min) is provided to the look-up table for selecting control signals C_EE for edge enhancement and C_NR for noise reduction. FIG. 8 is two graphs illustrating the relationships between the difference (Max−Min) and the two control signals C_EE and C_NR. A greater difference implies an edge is more likely, thus mapping to a larger control signal C_EE for edge enhancement, and a smaller control signal C_NR for noise reduction.

The amount of noise reduction is responsive to the control signal C_NR, and a larger degree of filtering is applied to the input of the noise reduction circuit for a smaller control signal C_NR. The noise reduction circuit may perform the calculation shown in Equation (3) to alter the value of the target pixel P4.

$$P4 = P4 - NGain \times \text{C\_NR} \times \left(P4 - \frac{P0 + P1 + P2 + P3 + P5 + P6 + P7 + P8}{8}\right) \quad \text{Equation (3)}$$

NGain, a noise reduction gain, and the noise reduction control signal C_NR determine the signal strength attenuation for the target pixel P4. If the level of variation is zero (for example, the difference Max−Min=0), P4 is likely to be located in a smooth area and the control signal C_NR is equal to 1, there is no inhibition of noise reduction in this case. When the level of variation increases, the control signal C_NR decreases rapidly toward zero with the level of noise reduction decreasing accordingly. The noise reduction circuit does not alter the target pixel P4 if the control signal C_NR equals to zero.

Edge enhancement is responsive to the control signal C_EE, with more edge enhancement applied for a larger control signal C_EE. The edge enhancement circuit may perform the calculation shown in Equation (4) to alter the target pixel P4.

$$P4 = P4 + EGain \times \text{C\_EE} \times \left(P4 - \frac{P0 + P1 + P2 + P3 + P5 + P6 + P7 + P8}{8}\right) \quad \text{Equation (4)}$$

EGain is an edge enhancement gain. When the level of variation is zero, the control signal C_EE is equal to 0, there is no edge enhancement as the target pixel is determined to be in a smooth area. When the level of variation increases, the control signal C_EE increases rapidly toward 1 such that the level of edge enhancement increases accordingly.

The set of directional filters determining the correlations of the predetermined directions can be replaced by any combination of direction detection circuits capable of detecting the probabilities or likelihood of edge existence. The variation calculator may be implemented using an entropy calculator calculating the entropy on the set of probabilities. High entropy values indicate little knowledge about the edge orientation and lower entropy values indicate significant knowledge of edge orientation. The probability $Pb_0$ that the target pixel P4 belongs to an edge formed by P3, P4, P5 (horizontal direction as shown in FIG. 6) can be calculated by Equation (5).

$$Pb_0 = \frac{hf_0}{hf_0 + hf_1 + hf_2 + hf_3 + hf_4 + hf_5 + hf_6 + hf_7}$$

Equation (5)

The other seven probabilities $Pb_1 \sim Pb_7$ can be calculated using a similar equation and the entropy of the set of probability distribution is calculated by Equation (6).

$$\text{entropy} = -\sum_{i=0}^{i=7} Pb_i \times \log Pb_i$$

Equation (6)

The provided image processing systems can be implemented in video player devices, such as televisions, VCD players, DVD players, and the like, receiving a video signal and modifying the signal to achieve noise reduction and edge enhancement effects according to probabilities of edge existence measured in predetermined directions. The video player device then feeds the modified video signal to execute video signal processing, and displays or outputs the processed video signal.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An image processing method providing noise reduction and edge enhancement for a video signal, comprising:
    extracting a plurality of pixels from the video signal;
    evaluating measures of edge existence in a plurality of predetermined directions within the extracted pixels;
    determining a control signal according to a level of variation on the measures of edge existence;
    mapping the level of variation to the control signal in accordance with a non-decreasing mapping function;
    performing noise reduction on the extracted pixels according to the control signal; and
    performing edge enhancement on the extracted pixels according to the control signal.

2. The image processing method according to claim 1, further comprising determining a level of variation by calculating a difference between a maximum and a minimum value of the measures of edge existence.

3. The image processing method according to claim 1, wherein the lower the control signal value, the greater the noise reduction and the less the edge enhancement on the extracted pixels.

4. The image processing method according to claim 1, wherein the level of variation is determined by calculating entropy of the measures of edge existence.

5. The image processing method according to claim 1, further comprising median filtering of the video signal to effect noise reduction in the measures of edge existence.

6. An image processing system executing noise reduction and edge enhancement for a video signal, comprising:
    a variation detector, evaluating measures of edge existence in a plurality of predetermined directions within pixels of the video signal, and determining a control signal according to a level of variation on the measures of edge existence wherein the variation detector comprises:
        an edge direction detector, evaluating the measures of edge existence in the predetermined directions;
        a variation calculator, calculating the level of variation on the measures of edge existence; and
        a look-up table, mapping the level of variation output from the variation calculator to a control signal;
    a noise reduction circuit, performing noise reduction on the pixels of the video signal according to the control signal; and
    an edge enhancement circuit, receiving the output of the noise reduction circuit and performing edge enhancement on the pixels of the video signal according to the control signal.

7. The image processing system according to claim 6, wherein the look-up table maps the level of variation to the control signal in accordance with a non-decreasing mapping function.

8. The image processing system according to claim 7, wherein a smaller control signal value causes greater noise reduction in the noise reduction circuit and less edge enhancement in the edge enhancement circuit.

9. The image processing system according to claim 6, wherein the variation detector comprises a plurality of directional filters, each measuring a probability of edge existence in one of the predetermined directions as the measures of edge existence.

10. The image processing system according to claim 6, wherein the variation detector comprises a median filter reducing noises in the video signal for evaluating the measures of edge existence.

11. The image processing system according to claim 6, wherein the variation detector comprises:
    a maximum detector, detecting a maximum value of the measures of edge existence;
    a minimum detector, detecting a minimum value of the measures of edge existence; and
    a subtractor, calculating a difference between the maximum and minimum values as an indication of the level of variation.

12. The image processing system according to claim 6, wherein the variation detector comprises an entropy calculator, calculating entropy on the measures of edge existence for determining the level of variation.

13. The image processing system according to claim 12, wherein the variation detector further comprises a look-up table, mapping the level of variation output from the entropy calculator to a control signal according to a non-increasing mapping function.

14. A video player device for processing a video signal for noise reduction and edge enhancement, comprising:
    a memory device, buffering pixels extracted from the video signal;
    a variation detector, acquiring the extracted pixels from the memory device, evaluating measures of edge existence in a plurality of predetermined directions, within the extracted pixels, and determining a control signal according to a level of variation on the measures of edge existence, wherein the variation detector comprises:
        an edge direction detector, evaluating the measures of edge existence in the predetermined directions;

a variation calculator, calculating the level of variation on the measures of edge existence; and a look-up table, mapping the level of variation output from the variation calculator to a control signal;

a noise reduction circuit, performing noise reduction on the pixels of the video signal according to the control signal; and an edge enhancement circuit, performing edge enhancement on the pixels of the video signal according to the control signal.

15. The video player device according to claim 14, wherein the look-up table maps the level of variation to the control signal in accordance with a non-decreasing mapping function.

16. The video player device according to claim 15, wherein a smaller control signal value causes greater noise reduction in the noise reduction circuit and less edge enhancement in the edge enhancement circuit.

17. The video player device according to claim 14, wherein the variation detector comprises a plurality of directional filters, each evaluating the measures of edge existence in one of the predetermined directions.

18. The video player device according to claim 14, wherein the variation detector comprises a median filter reducing noise in the video signal for evaluating the measures of edge existence.

19. The video player device according to claim 14, wherein the variation detector comprises:

a maximum detector, detecting a maximum value of the measures of edge existence;

a minimum detector, detecting a minimum value of the measures of edge existence; and a subtractor, calculating a difference between the maximum and minimum values as an indication of the level of variation.

20. The video player device according to claim 14, wherein the variation detector comprises an entropy calculator, calculating entropy on the measures of edge existence for determining the level of variation.

21. The video player device according to claim 20, wherein the variation detector further comprises a look-up table, mapping the level of variation output from the entropy calculator to a control signal according to a non-increasing mapping function.

* * * * *